United States Patent Office 2,957,897
Patented Oct. 25, 1960

2,957,897

PREPARATION OF ALUMINUM ALKYLS

Ralph William King, Altrincham, and David Joseph Movsovic, Timperley, England, assignors to Shell Oil Company, a corporation of Delaware No Drawing. Filed Oct. 29, 1957, Ser. No. 693,023

Claims priority, application Great Britain Nov. 5, 1956

9 Claims. (Cl. 260—448)

This invention relates to the manufacture of aluminum alkyl compounds. More particularly, it relates to improved methods in the manufacture of aluminum dialkyl halides resulting in increased efficiency and safety.

Aluminum dialkyl halides are widely used in the preparation of certain polymerization catalysts. Such aluminum compounds include aluminum dimethyl chloride, aluminum dimethyl bromide, aluminum diethyl chloride, aluminum diethyl bromide, aluminum diisopropyl chloride, and the like. These and similar aluminum alkyls are commonly prepared by the so-called "sodium dehalogenation method" which comprises reacting about 4 moles of an aluminum alkyl sesquihalide with about 3 moles of the alkali metal as expressed by the following equation:

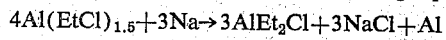
$$4Al(EtCl)_{1.5} + 3Na \rightarrow 3AlEt_2Cl + 3NaCl + Al$$

For the purposes of this specification a mole of aluminum alkyl sesquihalide is to be computed in accordance with the aluminum ethyl sesquichloride given in the above reaction. Such reactions must be conducted with caution as highly flammable materials are involved which may ignite on contact with air. In conducting the sodium dehalogenation reactions a closed steel reactor is normally used with reaction temperatures ranging from about 120° C. to about 180° C. After the reaction is complete the aluminum dialkyl halide is distilled under vacuum to recover it. The residue from the distillation is deposited on the walls of the reaction vessel. The residue is a hard, crusty material which comprises a complex of sodium halide, finely divided aluminum and organo-aluminum compounds. The complex is a pyrophoric material which is difficult to remove from the walls of the reactor and the treatment of the complex for its removal has heretofore been attended with considerable fire risk.

Heretofore the residue was treated with a hydrocarbon oil to obtain a slurry of the residue. Thereafter the slurry was treated with a lower alcohol such as isopropanol or methanol. The added alcohol reacted violently with the evolution of heat and flammable vapors. Therefore, safety considerations required that the reaction vessel be transferred to an area in which no damage would result in case the vapors ignited. An alternative method for the removal of the residue was to treat it with a hydrocarbon oil in an atmosphere of inert gas, such as nitrogen, while adding a lower alcohol to decompose the residue. As the vapors formed they were removed through an external vent preferably through an intervening cooler. Because such residues are very compact it was most often necessary to further treat the residue in order to remove completely all of it. These prior art methods of removing the residue required about 12 hours of constant attention in addition to which it was required to transport the reaction vessel from its normal operating location to a location where the cleaning operation may be safely conducted. The prior art methods have the further disadvantage in that the amount of aluminum dialkyl halide which can be safely and economically produced is limited.

This invention provides processes whereby the formation of the above-described pyrophoric residue is substantially reduced or eliminated, thereby permitting greater efficiency in the preparation of certain aluminum dialkyl halides.

It is an object of this invention to provide improved processes for the preparation of aluminum dialkyl halides. It is another object of this invention to provide processes for the preparation of aluminum dialkyl halides in which the formation of a pyrophoric residue in the reactor is substantially or completely eliminated. Further, it is an object of this invention to provide improvements in the "sodium dehalogenation method" for the preparation of aluminum diethyl halides and aluminum dimethyl halides wherein the formation of the pyrophoric residue on the walls of the reactor is completely or substantially eliminated. It is yet another object to provide improved processes for the preparation of these aluminum dialkyl halides which are efficient and more safe. Other objects will become apparent as the description of the invention proceeds.

These and other objects are accomplished by the process for the production of aluminum dialkyl halides which comprises reacting, at temperatures ranging from about 100° C. to about 200° C., from 3 to 5 moles of an alkali metal with about 10 moles of an aluminum alkyl sesquihalide. By proceeding in this manner the pyrophoric residue in the reactor is wholly or largely fusible and can be drained sufficiently completely to permit immediate reuse of the reactor for the preparation of another batch of the aluminum dialkyl halide without further treatment of the vessel. After a number of batch reactions of this type there may be some accumulation of the residue which may be removed by any known means. Alternatively, it may be advantageous to rinse the vessel with a hydrocarbon oil after each batch followed by a rinse with a lower alcohol thereby avoiding an accumulation of the deposit in the reactor.

The processes of this invention are equally suitable for the preparation of aluminum dialkyl halides in general but the processes are particularly for the preparation of lower aluminum dialkyl halides as they have the greatest utility as polymerization catalysts. The alkali metal which is employed in the processes of this invention may be any alkali metal such as sodium, potassium, lithium, and the like. In the preferred embodiment sodium or potassium or mixtures thereof are employed with sodium being the most preferred. As indicated above, the alkali metal is employed in a molar ratio of about 3 to 5 moles for about 10 moles of the aluminum alkyl sesquihalide.

In conducting the processes of this invention elevated temperatures are required which range from 100 to 200° C. It will hereinafter appear that it is not necessary to maintain the temperature of the reaction constant since no advantage is obtained thereby. Actually, it is very difficult to maintain a constant reaction temperature for the reason that the reaction is exothermic and accordingly there will be temperature fluctuations as the reaction proceeds. In the preferred embodiment it will be found that operation at temperatures between 115° C. and 175° C. is most convenient. The processes of this invention do not require the use of pressure vessels in order to obtain the desired product. However, it is found to be desirable to conduct the reactions in a closed vessel in order to provide greater safety. When the reaction is conducted in a closed vessel the pressure within the reactor may be at autogenic pressures and as no useful purpose is accomplished by further pressure control.

After the reaction is complete the temperatures and pressures are gradually reduced to a suitable value for the separation of the aluminum dialkyl halide which may be accomplished by decanting, filtering, or distilling. In the preferred procedure, distillation is employed. It will be observed that operations in this way will avoid any substantial formation of residue within the reactor for about 12 to 20 batches before washing to remove accumulated residue is necessary.

The inventive process of this invention may be advantageously employed by preparing the aluminum alkyl sesquihalide in situ and thereafter treating the sesquihalide thus prepared as indicated above. This may be accomplished, for example, by preparing the sesquichloride by the reaction of aluminum and a normal alkyl halide, as ethyl chloride, whereupon the sesquichloride is formed.

The processes of this invention are described in specific detail in the following examples:

Example I

This example illustrates the preparation of aluminum diethyl chloride from aluminum ethyl sesquichloride which is formed in situ.

To a 25 gallon steel reactor provided with an agitator, a condenser and suitable fixtures for vacuum distillation is charged, after purging with nitrogen, 30 pounds of powdered aluminum, 8 pounds of aluminum diethyl chloride and 410 grams of iodine. The aluminum diethyl chloride and the iodine are employed as they appear to have a catalytic effect on the reaction. The contents of the vessel are slowly heated to about 130° C. and 110 pounds of ethyl chloride is gradually added over a three hour period with the temperature being maintained from 120 to 150° C. Thereafter the temperature is raised to about 175° C. and 8.5 pounds of metallic sodium is slowly added. Addition of the sodium is completed within 45 minutes and with constant agitation the sodium dehalogenation reaction is conducted for about 60 minutes at temperatures ranging from 160 to 190° C. Thereafter, the temperature is reduced to about 113° C. and distillation is conducted at pressures ranging from 30 to 37 mm. Hg. The pyrophoric residue is then drained and the reactor is ready immediately for another batch.

Example II

The procedure of Example I is repeated except that the alkyl sesquihalide and the aluminum diethyl chloride are prepared from the following amounts of the ingredients:

| | | |
|---|---|---|
| Aluminum | pounds | 30 |
| Ethyl chloride | do | 109 |
| Aluminum diethyl chloride | do | 7.2 |
| Iodine | grams | 350 |
| Sodium | pounds | 9 |

In this example the distillation pressures range from 33 to 38 mm. Hg. but no substantial differences result.

Example III

To a pressure vessel equipped with an agitator, and suitable fixtures for distillation is charged 58.5 pounds of aluminum ethyl sesquichloride. The sesquichloride is warmed to 175° C. whereupon 2.5 pounds of sodium are added to the vessel over a 30 minute period. With constant agitation the sesquichloride and sodium are reacted at temperatures ranging from 155–190° C. over a period of 60 minutes. Thereafter the contents of the vessel are distilled at a temperature from 100–161° C. at pressures ranging from 10 to 46 mm. Hg. As in the above examples the residue is drained from the reactor.

Example IV

The procedure of Example III is repeated except that an equivalent amount of aluminum octyl sesquichloride replaces the ethyl sesquichloride. After the separation of the product the residue is drained from the vessel. In this case it is observed that slightly more residue is present than in Example III.

From the foregoing it will be seen that various modifications of the process may be undertaken. Thus, for example, the alkali metal and the sesquihalide may be added at any rate. Still other modifications may be undertaken without departing from the spirit of the invention.

We claim as our invention:

1. The process comprising reacting about 10 moles of aluminum alkyl sesquihalide with about 3 to 5 moles of an alkali metal and distilling off aluminum dialkyl halide and draining the residues from the reaction vessel.

2. The process of claim 1 in which the alkali metal is sodium.

3. The process of claim 1 in which the alkali metal is potassium.

4. The process comprising reacting about 10 moles of aluminum ethyl sesquichloride with about 3 to 5 moles of an alkali metal and distilling off aluminum diethyl chloride and draining the residue from the reaction vessel.

5. The process of claim 4 in which the alkali metal is sodium.

6. The process of claim 4 in which the alkali metal is potassium.

7. The process comprising reacting about 10 moles of aluminum methyl sesquichloride with about 3 to 5 moles of an alkali metal, and distilling off aluminum methyl chloride and draining the residue from the reaction vessel.

8. The process of claim 7 in which the alkali metal is sodium.

9. The process of claim 7 in which the alkali metal is potassium.

References Cited in the file of this patent

FOREIGN PATENTS 535,085 Belgium _____ July 22, 1955

OTHER REFERENCES

Grignard et al.: Bull. Soc. Chem. Paris (1925), pp. 1376–1385.

Grosses et al.: J. Organic Chemistry (1940), pp. 110 and 120.